US009611716B2

(12) United States Patent
Daou et al.

(10) Patent No.: US 9,611,716 B2
(45) Date of Patent: Apr. 4, 2017

(54) COMPOSITIONS AND METHODS FOR REDUCING FLUID LOSS

(71) Applicant: SCHLUMBERGER TECHNOLOGY CORPORATION, Sugar Land, TX (US)

(72) Inventors: Fatma Daou, Leblon (BR); Bernhard Lungwitz, Rio de Janeiro (BR); Olga Alexandrovna Minikh, Novosibirsk (RU); Diankui Fu, Kuala Lumpur (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 602 days.

(21) Appl. No.: 13/630,781

(22) Filed: Sep. 28, 2012

(65) Prior Publication Data

US 2014/0090895 A1 Apr. 3, 2014

(51) Int. Cl.
*E21B 33/138* (2006.01)
*C09K 8/035* (2006.01)
*C09K 8/50* (2006.01)
*E21B 21/00* (2006.01)

(52) U.S. Cl.
CPC ............ *E21B 33/138* (2013.01); *C09K 8/035* (2013.01); *C09K 8/50* (2013.01); *E21B 21/003* (2013.01)

(58) Field of Classification Search
CPC ..................................... E21B 33/14
USPC .............................. 166/293; 175/64; 524/205
See application file for complete search history.

(56) References Cited

U.S. PATENT DOCUMENTS

| 3,953,336 | A | 4/1976 | Daigle |
| 4,299,710 | A | 11/1981 | Dupre et al. |
| 4,620,596 | A | 11/1986 | Mondshine |
| 5,028,342 | A | 7/1991 | Opitz et al. |
| 5,783,527 | A | 7/1998 | Dobson, Jr. et al. |
| 6,581,701 | B2 | 6/2003 | Heying |
| 7,220,708 | B2 | 5/2007 | Zamora et al. |
| 7,678,742 | B2 | 3/2010 | Munoz, Jr. et al. |
| 7,726,400 | B2 | 6/2010 | Zusatz et al. |
| 7,866,394 | B2 | 1/2011 | Creel et al. |
| 7,923,413 | B2 | 4/2011 | Ghassemzadeh |

(Continued)

FOREIGN PATENT DOCUMENTS

| EP | 1623089 B1 | 7/2008 |
| EP | 2450417 A1 | 8/2010 |

(Continued)

OTHER PUBLICATIONS

Daniel L. Hertz, Jr., Elastomers in the Hot Sour Gas Environment, Seals Eastern Inc., P.O. Box 519, Red Bank, N. J. 07701, 6 pages.

(Continued)

*Primary Examiner* — Angela M DiTrani
*Assistant Examiner* — Anuradha Ahuja

(57) ABSTRACT

The current application discloses compositions and methods for reducing fluid loss during subterranean operations. $CO_2$ activated swellable elastomers can be used in subterranean operations to reduce fluid loss. In particular, the current application discloses compositions and methods for reducing lost circulation during drilling and drilling related subterranean operations.

16 Claims, 2 Drawing Sheets

(56) References Cited

U.S. PATENT DOCUMENTS

| | | |
|---|---|---|
| 8,138,124 B2 | 3/2012 | Kakadjian et al. |
| 2005/0113262 A1* | 5/2005 | Ravi ................. C09K 8/03 507/125 |
| 2008/0023205 A1* | 1/2008 | Craster ............. E21B 23/06 166/387 |
| 2008/0108524 A1 | 5/2008 | Willberg et al. |
| 2009/0095475 A1* | 4/2009 | Ravi ............. C04B 24/2682 166/293 |
| 2010/0298175 A1* | 11/2010 | Ghassemzadeh .... C09K 8/5045 507/124 |
| 2011/0067868 A1 | 3/2011 | Le Roy-Delage et al. |
| 2011/0077324 A1 | 3/2011 | Ravi et al. |
| 2011/0083902 A1 | 4/2011 | Huang et al. |
| 2011/0257333 A1 | 10/2011 | Adam et al. |
| 2012/0175118 A1* | 7/2012 | Khatri ............... C04B 28/02 166/293 |
| 2014/0060836 A1 | 3/2014 | Daou et al. |
| 2014/0110114 A1 | 4/2014 | Daou et al. |

FOREIGN PATENT DOCUMENTS

| | | |
|---|---|---|
| EP | 2404975 A1 | 1/2012 |
| WO | 2004101951 A1 | 11/2004 |

OTHER PUBLICATIONS

T. Pervez, S.Z. Qamar, R.A. Siddiqui, M. Van De Velden, Effect of Exposure on Material Response of a Swelling Elastomer, Archives of Materials Science and Engineering, Jun. 2009, pp. 77-84, vol. 37, Issue 2.

O.M. Davies, J.C. Arnold, S. Sulley, The mechanical properties of elastomers in high-pressure $CO_2$, Journal of Materials Science 34 (1999) pp. 417-422.

"High performance Fluoroelastomers; Product comparison guide," 3M Company, 2004.

"A technical guide to Elastomers Compounds and Chemical Compatibility," Precision Polymer Engineering Ltd, May 2006.

\* cited by examiner

COMPOSITIONS AND METHODS FOR REDUCING FLUID LOSS

RELATED APPLICATION DATA

None.

BACKGROUND

The statements in this section merely provide background information related to the present disclosure and may not constitute prior art.

The present application relates to the treatment of subterranean formations. More particularly, the present application relates to compositions and methods utilizing $CO_2$ activated swellable elastomers in subterranean operations.

In subterranean operations, such as drilling, hydraulic fracturing, gravel packing, cementing, there may be several instances where it may be desirable to control or prevent the passage of fluid through a portion of a subterranean formation, control or prevent the production of an undesirable fluid through a well bore, and/or isolate specific areas in a well bore or zones in a subterranean formation.

In particular, drilling operations involve the use of drilling mud, which has a number of functions including lubricating the drill bit, carrying drill cuttings to the surface, and/or balancing formation pressure exerted on the wellbore. Pressure differentials between the wellbore and formation, fractures in the formation, and/or large vugs, among other causes, may result in undesirable loss of drilling mud from the wellbore ("lost circulation"). Lost circulation during drilling operations introduces hazards, costs, and potentially compromises the quality of zonal isolation. In some cases, drilling operations must be stopped until the lost circulation is regained and fluid loss to the fracture is reduced to an acceptable level. In other cases, lost circulation can result in the loss of the well altogether.

There is a constant need for a fluid having improved fluid loss/lost circulation properties.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, there is provided a method for reducing fluid loss in a subterranean formation penetrated by a borehole. The method comprises pumping into the borehole a treatment fluid comprising a material that swells upon contact with carbon dioxide; exposing the treatment fluid to carbon dioxide; and allowing the material to swell and increase volume, thereby reducing fluid loss downhole.

According to another aspect, there is provided a method of reducing loss circulation in a drilling operation. The method comprises adding to a drilling fluid a material that swells when contacts with carbon dioxide; performing a drilling operation with the drilling fluid to create a borehole penetrating a subterranean formation; exposing the drilling fluid to carbon dioxide downhole; and allowing the material to swell, thereby reducing lost circulation during the drilling operation.

In all aspects of the current application, the CO2 swellable material can be selected from a group consisting of chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1:
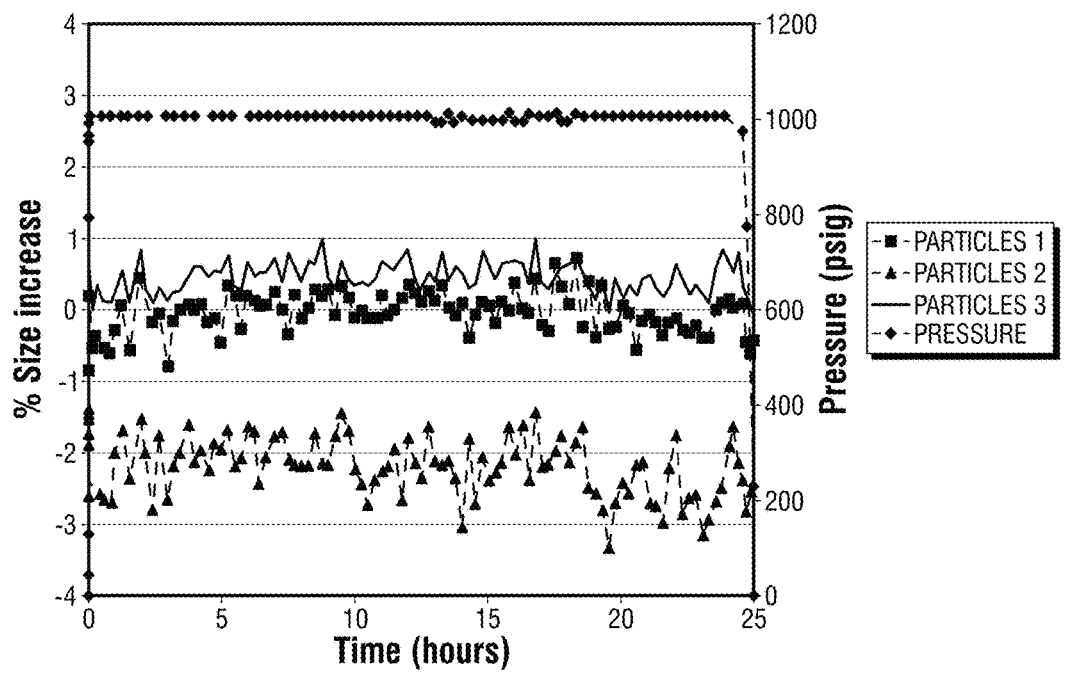
FIG. 1 shows the swelling behavior of VITON™ elastomer particles in the presence of nitrogen.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

As used herein, the terms "treatment fluid" or "wellbore treatment fluid" are inclusive of "drilling fluid", "fracturing fluid", or "treatment slurry" and should be understood broadly. These may be or include a liquid, a solid, a gas, and combinations thereof, as will be appreciated by those skilled in the art. A treatment fluid may take the form of a solution, an emulsion, a slurry, or any other form that is substantially continuous under a given condition, as will be appreciated by those skilled in the art.

It should be understood that, although a substantial portion of the following detailed description is provided in the context of drilling operations, other subterranean operations such as hydraulic fracturing, cementing, gravel packing, etc., or even non-oilfield well treatment operations, can utilize and benefit from the disclosure of the current application as well.

The carbon dioxide may be wet, dry, supercritical or dissolved in an liquid medium such as water, oil, reservoir fluid, or the combination thereof. In an aspect, embodiments relate to methods for reducing fluid loss in a subterranean well having a borehole, into which carbon dioxide is injected, stored, extracted or naturally present. By naturally present, it should be understood that the carbon dioxide is present in the borehole, or the void/fracture/hole/channel in the subterranean formation at a concentration sufficient to activate the swelling of the elastomer. In another aspect, embodiments relate to methods for reducing fluid loss in a subterranean well having a borehole, in which carbon dioxide is injected, stored, extracted or naturally present.

As stated earlier, a treatment fluid that exhibits improved fluid loss property in an environment containing carbon dioxide would be positively received by the industry. The inventors have determined that treatment fluid comprising materials that swell in the presence of carbon dioxide would respond to the industry challenges as such carbon dioxide swellable compounds will at least partially seals a void, a fracture, a hole, a channel or a combination thereof. As used herein, the term "fluid loss" includes the lost circulation in drilling operations.

The concentration of carbon dioxide that is sufficient to active the swelling of the elastomer is dependent on the swellable material that is used in the operation and can be determined in laboratory or field. In some embodiments, the concentration of carbon dioxide is at least 1 mole per liter of fluid; in some embodiments, the concentration of carbon dioxide is at least 2.5 moles per liter of fluid; in some embodiments, the concentration of carbon dioxide is at least 5 moles per liter of fluid.

Examples of the elastomers that are suitable for the current application include, but are not limited to, chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof. The aqueous inverse emulsion of polymer comprising a betaine group can be manufactured by the methods and/or materials described in US2011/0257333 and EP2404975, the entire contents of both are hereby incorporated by reference into the current application.

The concentration of the material in the treatment fluid may be between about 5% and 50% by volume of solids in the treatment fluid. In some embodiments, the range may be between about 10% and 40% by volume of solids in the treatment fluid. In some embodiments, the range may be between about 15% and 30% by volume of solids in the treatment fluid. For optimal performance, the particle-size distribution of the material may be such that the average particle size is between about 10 µm and about 1000 µm. The average particle size may also be between about 100 µm and 900 µm.

In some embodiments, the swelling capability of the swellable material is enhanced under downhole pressure. Stated in other words, in some embodiments, the swellable material does not swell, or only swell to a limited degree, when prepared at the surface or being delivered from the surface to the downhole target zone. However, such swellable material swells, or swells to a full degree, when it is successfully delivered to the downhole target zone and subject to the downhole pressure.

The treatment fluid may further comprise dispersing agents, fluid-loss-control agents, set retarders, set accelerators, foaming agents, gas generating agents, antifoaming agents, extenders, weighting agents, lost-circulation control agents and combinations thereof. Other compounds may also be present such as coal, petroleum coke, graphite or gilsonite and mixtures thereof. Further, the carbon dioxide swellable elastomers may be couple to water super absorbent polymers such as those described in EP 1623089 or US 20110067868 incorporated herein in its entirety. A further association may be with one or more compounds from the list comprising poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, ethylene propylene diene monomer, ethylene propylene monomer rubber, styrene-butadiene rubber, styrene/propylene/diene monomer, brominated poly (isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers and bivalent cationic compounds or any other particles such as those described in WO2004/101951 that swells when exposed to liquid hydrocarbons, the international application being incorporated herein by reference in its entirety. Further combination may be made with thermoplastic block polymers including for example styrene-isoprene-styrene (SIS), styrene-butadiene-styrene (SBS) and mixtures thereof, such as those disclosed in EP2450417, the entire contents of which are incorporated herein by reference.

In some embodiments, the treatment fluid is a drilling fluid (commonly called "mud"). Drilling fluids have a number of functions, including but not limited to, lubricating the drilling tool and drill pipe which carries the tool, providing a medium for removing formation cuttings from the well to the surface, counterbalancing formation pressure to prevent the inflow to the wellbore of gas, oil, and/or water from permeable or porous formations which may be encountered at various levels as drilling progresses, preventing the loss of drilling fluids to void spaces and to permeable or porous formations, maintaining hole stability prior to setting the casing, minimizing formation damage, and holding the drill cuttings in suspension, especially in the event of a shutdown in drilling and interruption of pumping of the drilling mud.

The drilling fluid must circulate in the wellbore (down the drill pipe and back up the annulus) in order to perform all of the desired functions to allow the drilling process to continue. Therefore, drilling fluid should remain in the wellbore all the time, otherwise well control and caving in of the wellbore is immediate. Sometimes penetration of undesirable formation conditions causes substantial to severe losses of the drilling fluid to the formation. The features responsible for such losses can be related to small to large fissures, or natural or induced fractures in the formation; the losses may also be through highly porous rock.

Fluid loss is a common occurrence in drilling operations. Drilling fluids of current application can seal porous formations intentionally while drilling. This occurs as the result of swelling of the elastomer material when it is in contact of downhole carbon dioxide, forming a less permeable filter cake along the wellbore, formation surface, etc. to seal a porous formation during drilling and for the purpose of wellbore stabilization.

The composition and methods of the current application can be used in either water-based drilling fluids or oil-based drilling fluids. Water-based muds are typically slurries of clay solids and polymers; the concentrations and densities are adjusted to provide the specific properties required for drilling, well protection, temperature control, and the other mud functions. Water-based muds may be used as the base fluids for the treatment fluids of the Invention (with suitable adjustment of the amounts of the components of the particulate solids blend to account for the solids already in the mud). Oil-based muds may contain diesel, poly alpha olefins, modified esters and ethers, mineral oils, other hydrophobic materials, and mixtures of these. Oil-based muds may also be invert emulsions of oil in which up to 50% water is dispersed in the oil; the oil is the external phase and water is the internal phase. Examples of the drilling fluids that are suitable for the current application include those disclosed in U.S. Pat. No. 3,953,336, U.S. Pat. No. 4,299,710, U.S. Pat. No. 4,620,596, U.S. Pat. No. 5,028,342, U.S. Pat. No. 5,783,527, U.S. Pat. No. 7,220,708, U.S. Pat. No. 7,678,742, U.S. Pat. No. 7,923,413, U.S. Pat. No. 8,138,124, the entire contents of which are incorporated by reference into the current application.

Examples of the elastomers that are suitable for use in drilling fluids include, but are not limited to, chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof. The concentration of the material in the treatment fluid may be between about 5% and 50% by volume of solids in the treatment fluid. In some embodiments, the range may be between about 10% and 40% by volume of solids in the treatment fluid. In some embodiments, the range may be between about 15% and 30% by volume of solids in the treatment fluid. For optimal performance, the particle-size distribution of the material may be such that the average particle size is between about 10 μm and about 1000 μm. The average particle size may also be between about 100 μm and 900 μm.

The fluids and methods of the current application are particularly useful in carbonate reservoirs, although applications in other types of subterranean formation are also contemplated. Lost circulation of drilling fluid is one of the major challenges faced when drilling through carbonates because of their naturally fractured, vuggy and cavernous conditions. The current application discloses fluids and methods that are capable of reducing or preventing fluid losses in a highly fractured, vugular reservoir/formation. The fluid loss reduction/prevention effect is achieved by exposing a swellable material to a trigger downhole such that the swellable material increases in size and plugs the leakage point. In some embodiments, the downhole trigger is carbon dioxide. In some embodiments, the downhole trigger is reservoir fluids, such as crude oil, natural gas, $H_2S$, etc. As used herein, the term "reservoir fluid" does not include water.

In some embodiments, the fluid loss reduction/prevention effect is achieved by exposing the swellable material to an in-situ reservoir fluid, in particular, carbon dioxide. In some embodiments, the fluid loss reduction/prevention effect is achieved by exposing the swellable material to a reservoir fluid, in particular, carbon dioxide, which are generated downhole during the oilfield operation. In some embodiments, the fluid loss reduction/prevention effect is achieved by exposing the swellable material to a reservoir fluid, in particular, carbon dioxide, which is introduced downhole during the oilfield operation.

Specific examples of introducing or generating fluids that are similar to reservoir fluids, in particular, carbon dioxide, downhole include, but are not limited to, foaming, emulsifying, inverse-emulsifying, encapsulation, inclusion of acid-generating compounds which reacts with subterranean formation to generate those fluids, etc.

In some embodiments, the swellable elastomer are used in combination with degradable materials such as particles or/and fibers and fibrous materials. To enhance $CO_2$ concentration in fractures, materials which generate acid under downhole conditions can be added. The material may enter into a fracture and generate acid, which reacts with carbonate formation to produce carbon dioxide. The carbon dioxide in combination with in-situ $CO_2$ assures further swelling of the elastomers. Examples of acid-generating materials include, but are not limited to, wax-capsules with citric acid powder and different PLA materials. Wax-capsules melt downhole thus releasing acid. PLA materials decompose gradually while generating acid. Gradual acid release into carbonate formation provides constant $CO_2$ supply and guarantees plug stability over time. PLA materials can be particles and/or fibers.

In some embodiments, a fluid loss pill is prepared that can be pumped downhole during a well operation. The pill may include the $CO_2$-swellable elastomers alone or together with degradable materials which are suspended in acidic fluid. Once it reaches the fractured zones, the pill may react with the formation fluid, dissolve carbonate to emit more $CO_2$ and swell under downhole conditions, gain volume and eventually block the lost circulation zone. When an acidic pill formulation is applied, in some embodiments, spacers before and after the pill may be employed to prevent alkaline treatment fluid (such as drilling mud) from reacting with the pill.

EXAMPLES

The following examples serve to further illustrate the disclosure. The following testing procedure was used for all examples.

Several particles of a test elastomer were placed inside a pressure cell equipped with a window that allows one to observe the behavior of materials within the cell. The cell supplier is Temco Inc., located in Houston, Tex. USA. The cell temperature is also adjustable. A camera captures images from inside the pressure cell, and image-analysis software is employed to interpret the behavior of materials inside the cell. After the elastomer particles were introduced into the cell, the cell was sealed. Either nitrogen or carbon dioxide gas was then introduced into the cell at 1000 psi (6.9 MPa), and the camera recorded the sizes of the particles during exposure periods up to 25 hours at 21° C. (70° F.).

Example 1

An O-ring made from a chlorofluorocarbon elastomer (VITON™, available from Parker Seals) was ground into pieces that were about 200 μm in size. Three particles (P1, P2 and P3) were placed into the pressure cell, and nitrogen was pumped into the cell until the pressure reached 1000 psi (6.9 MPa). During the testing period, the size of the VITON™ particles was periodically monitored. The results, shown in FIG. 1, reveal little change in the size of the particles during the test period.

Figure 2:
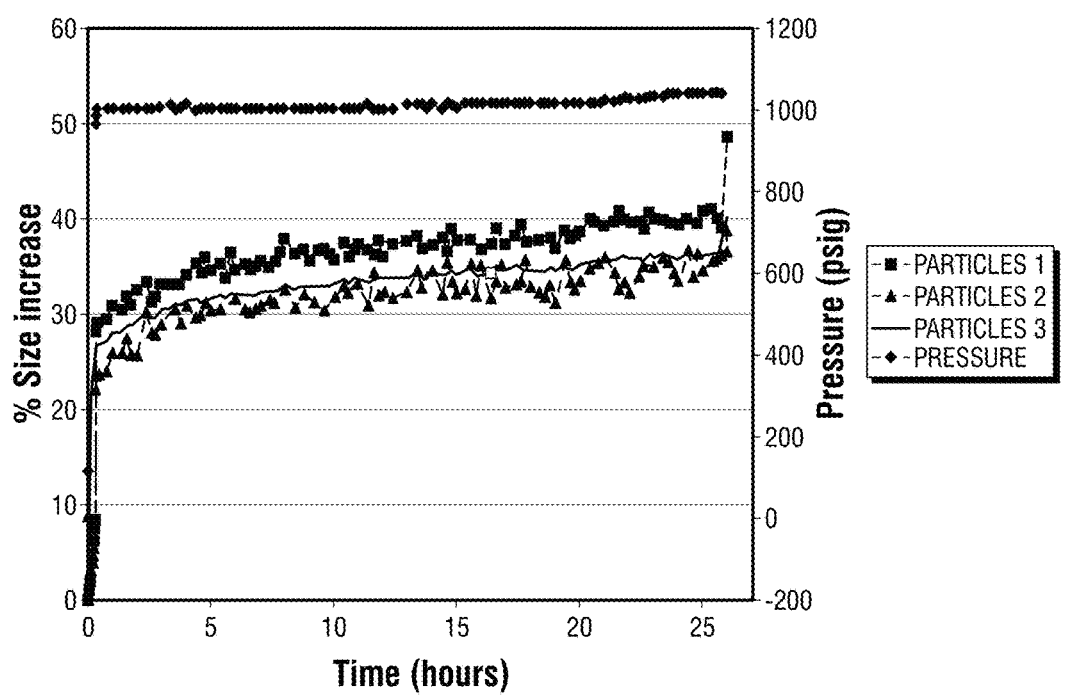
FIG. 2 shows the swelling behavior of VITON™ elastomer particles in the presence of carbon dioxide.

Then, the three VITON™ particles were exposed to carbon dioxide at about 1000 psi (6.9 MPa) and 21° C. As shown in FIG. 2, the particles swelled by about 35-48 vol % during the test period.

Example 2

Figure 3:
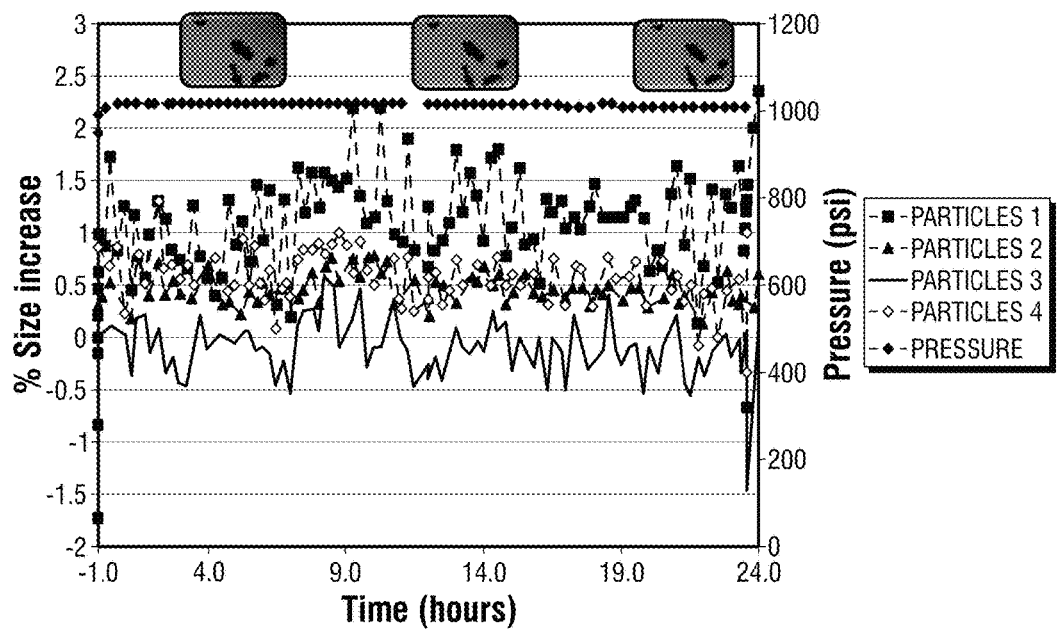
FIG. 3 shows the swelling behavior of AFLAS™ elastomer particles in the presence of nitrogen.

An O-ring made from a fluoroelastomer (AFLAS™, available from Seals Eastern) was ground into pieces that were about 200 μm in size. Four particles (Particles 1, 2, 3 and 4) were placed into the pressure cell, and nitrogen was pumped into the cell until the pressure reached 1000 psi (6.9 MPa). During the testing period, the size of the AFLAS™ particles was periodically monitored. The results, shown in FIG. 3, reveal little change in the size of the particles during the test period.

Figure 4:
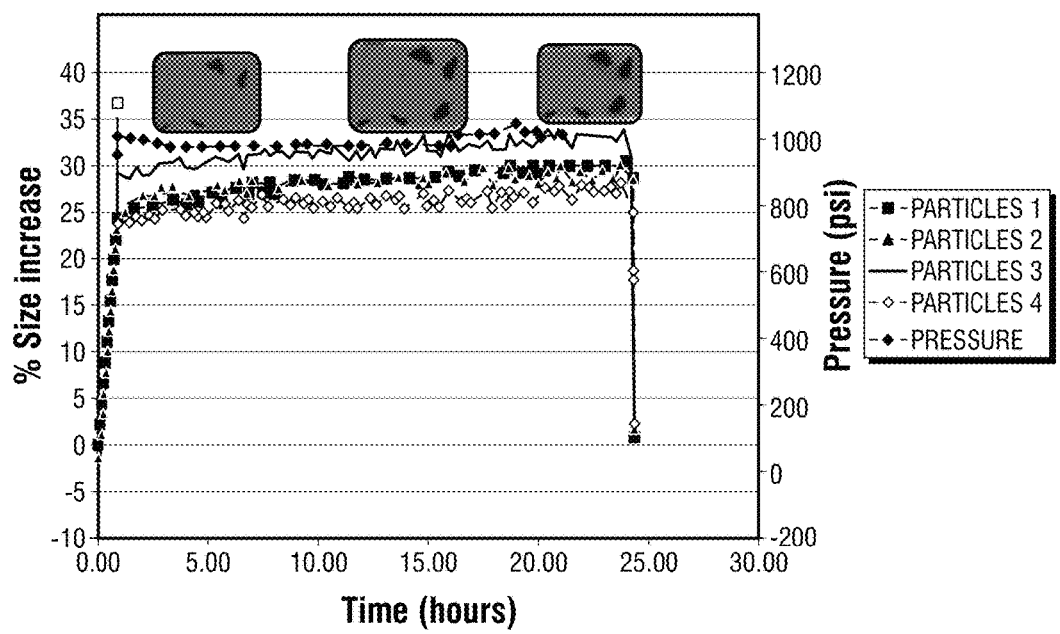
FIG. 4 shows the swelling behavior of AFLAS™ elastomer particles in the presence of carbon dioxide.

Then, the AFLAS™ particles were exposed to carbon dioxide at about 1000 psi (6.9 MPa) and 21° C. As shown in FIG. 4, the particles swelled by about 25-37 vol % during the test period Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

We claim:

1. A method for reducing fluid loss in a subterranean formation penetrated by a borehole, said method comprising:
   (i) pumping into the borehole and circulating a drilling fluid comprising a material that swells when contacted by carbon dioxide;
   (ii) injecting carbon dioxide into the borehole during the pumping the drilling fluid into the borehole;
   (iii) exposing the drilling fluid to the carbon dioxide while the drilling fluid circulates in the borehole and a portion of the drilling fluid is lost into the subterranean formation; and
   (iv) allowing the injected carbon dioxide to swell the material, thereby reducing further drilling fluid loss into the subterranean formation.

2. The method of claim 1, wherein the material comprises an elastomer comprising chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, or an aqueous inverse emulsion of polymer comprising a betaine group or combinations thereof.

3. The method of claim 1, wherein the concentration of the material in the drilling fluid is between 5 percent and 50 percent by volume of the drilling fluid.

4. The method of claim 1, wherein the material is a particle with an average particle size between 10 μm and 1000 μm.

5. The method of claim 1, wherein the carbon dioxide is supercritical, wet, dry or dissolved in an aqueous medium.

6. The method of claim 1, wherein the borehole penetrates at least one fluid-containing formation that contains a carbon dioxide concentration greater than five moles per liter.

7. The method of claim 1, wherein the carbon dioxide is encapsulated in a particulate contained in the drilling fluid.

8. The method of claim 1, wherein the drilling fluid further comprises dispersing agents, fluid-loss-control agents, set retarders, set accelerators, foaming agents, gas generating agents, antifoaming agents, extenders, weighting agents, or lost-circulation control agents or combinations thereof.

9. A method, comprising:
   (i) adding to a drilling fluid a material that swells when contacted with carbon dioxide;
   (ii) performing a drilling operation with the drilling fluid to create a borehole penetrating a subterranean formation;
   (iii) injecting carbon dioxide into the borehole during the drilling operation,
   (iv) exposing the drilling fluid to the carbon dioxide downhole as the drilling fluid circulates in the borehole and is lost into the subterranean formation; and
   (v) allowing the injected carbon dioxide to swell the material in the subterranean formation, thereby reducing lost circulation during the drilling operation.

10. The method of claim 9, wherein the material comprises an elastomer comprising chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, or an aqueous inverse emulsion of polymer comprising a betaine group or combinations thereof.

11. The method of claim 9, wherein the concentration of the material in the drilling fluid is between 5 percent and 50 percent by volume of the drilling fluid.

12. The method of claim 9, wherein the material is a particle with an average particle size between 10 μm and 1000 μm.

13. The method of claim 9, wherein the carbon dioxide is supercritical, wet, dry or dissolved in an aqueous medium.

14. The method of claim 9, wherein the subterranean formation contains fluid with a carbon dioxide concentration greater than five moles per liter.

15. The method of claim 9, wherein the carbon dioxide is encapsulated in a particulate contained in the drilling fluid.

16. A method for reducing fluid loss in a subterranean formation penetrated by a borehole, said method comprising:
- (i) pumping into the borehole a fluid comprising a material that swells when contacted by carbon dioxide;
- (ii) injecting carbon dioxide into the borehole during the pumping the fluid into the borehole
- (iii) exposing the fluid to the carbon dioxide as a portion of the fluid is lost into the subterranean formation; and
- (v) allowing the injected carbon dioxide to swell the material in the subterranean formation, thereby reducing further fluid loss into a void, a fracture, a hole, a channel, or a combination thereof, in the subterranean formation;

wherein the fluid is one of a drilling fluid, hydraulic fracturing fluid, or gravel packing fluid.

* * * * *